(12) United States Patent
Suzuki et al.

(10) Patent No.: US 10,378,403 B2
(45) Date of Patent: Aug. 13, 2019

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventors: Yuki Suzuki, Okazaki (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 15/884,959

(22) Filed: Jan. 31, 2018

(65) Prior Publication Data

US 2018/0266291 A1 Sep. 20, 2018

(30) Foreign Application Priority Data

Mar. 16, 2017 (JP) ................................ 2017-051178

(51) Int. Cl.
*F01N 3/10* (2006.01)
*F01N 3/08* (2006.01)
(Continued)

(52) U.S. Cl.
CPC ............. *F01N 3/103* (2013.01); *F01N 3/035* (2013.01); *F01N 3/085* (2013.01); *F01N 3/0814* (2013.01); *F01N 3/0842* (2013.01); *F01N 3/0885* (2013.01); *F01N 3/101* (2013.01); *F01N 3/208* (2013.01); *F01N 9/00* (2013.01); *F01N 2610/03* (2013.01); *F01N 2900/1602* (2013.01); *F01N 2900/1612* (2013.01); *Y02T 10/22* (2013.01); *Y02T 10/47* (2013.01)

(58) Field of Classification Search
CPC ...... F01N 3/035; F01N 3/0814; F01N 3/0842; F01N 3/085; F01N 3/0885; F01N 3/101; F01N 3/103; F01N 3/208; F01N 9/00; F01N 2610/03; F01N 2900/1602; F01N 2900/1612; Y02T 10/22; Y02T 10/47
See application file for complete search history.

(56) References Cited

U.S. PATENT DOCUMENTS 8,322,130 B2 * 12/2012 Yuza .................. B01D 53/9472
60/286
2015/0089926 A1 4/2015 Ikeda

FOREIGN PATENT DOCUMENTS

EP 2 420 655 A1 2/2012
EP 2 889 462 A1 7/2015
(Continued)

*Primary Examiner* — Brandon D Lee
(74) *Attorney, Agent, or Firm* — Oliff PLC

(57) ABSTRACT

A controller alternately repeats a desorption process of desorbing sulfur compound deposited on an NSR catalyst by supplying fuel from a direct injection valve to exhaust gas, and a pausing process of pausing fuel supply from the injection valve to the exhaust gas. The controller executes a cooling fuel addition for adding engine fuel from the addition valve of the exhaust passage to cool the addition valve during execution of the pausing process, and prohibit the cooling fuel addition during execution of the desorption process. The controller calculates a target temperature of the addition valve at the time of start of the desorption process such that the temperature of the addition valve during execution of the desorption process does not exceed an allowable upper limit temperature and calculates the addition amount at the time of cooling fuel addition.

4 Claims, 5 Drawing Sheets

(51) Int. Cl.
  *F01N 9/00*      (2006.01)
  *F01N 3/035*     (2006.01)
  *F01N 3/20*      (2006.01)

(56) References Cited

FOREIGN PATENT DOCUMENTS

| | | |
|---|---:|---:|
| JP | 4922899 B2 | 4/2012 |
| JP | 2014-224510 A | 12/2014 |
| JP | 2015-071962 A | 4/2015 |
| JP | 2015-121198 A | 7/2015 |
| WO | 2010/116535 A1 | 10/2010 |

\* cited by examiner

CONTROLLER FOR INTERNAL COMBUSTION ENGINE

BACKGROUND

The present disclosure relates to a controller for an internal combustion engine.

An internal combustion engine with a NOx storage reduction type catalyst installed in the exhaust passage is known. In such an internal combustion engine, NOx in the exhaust gas is stored in the catalyst, when combustion is performed at an air-fuel ratio leaner than a stoichiometric air-fuel ratio. When the air-fuel ratio of the air-fuel mixture burned in the internal combustion engine temporarily becomes a rich air-fuel ratio, NOx stored by the catalyst is reduced and purified. Thus, the emission of NOx to the outside air is reduced.

In the NOx storage reduction type catalyst, sulfur oxide (SOx) in the exhaust gas and NOx are stored as a sulfur compound such as sulfide salt. As the deposition of sulfur compounds progresses, the NOx storage capacity of the catalyst decreases and sulfur poisoning occurs.

Therefore, in the internal combustion engine equipped with the catalyst, as described in International Publication WO 2010/116535 and the like, a poison release control for reducing the sulfur compound deposited on the catalyst is performed. In the poison release control, fuel as a reducing agent is supplied to the exhaust gas flowing into the catalyst in the state in which the temperature of the catalyst is increased to a temperature (for example, 600° C.) required for desorption of sulfur compounds. As a result, a desorption process of desorbing and reducing the sulfur compounds deposited on the catalyst is performed. Further, in order to suppress the excessive rise in temperature of the catalyst due to the reduction reaction, after the desorption process is performed for a specified time, a pausing process of pausing the supply of fuel to the exhaust gas is performed. When the desorption process and the pause treatment are alternately repeated by the poison release control, the sulfur compound deposited on the catalyst gradually decreases.

In the desorption process, when fuel is supplied to the exhaust gas from a direct injection valve, which directly injects fuel into the cylinder, the air-fuel ratio of the exhaust gas flowing into the catalyst is made richer than the stoichiometric air-fuel ratio. During execution of the poison release control, the temperature of the exhaust gas increases to a temperature necessary for desorption of the sulfur compound. Therefore, the temperature of the addition valve provided in the exhaust passage also increases. Therefore, there is a risk of the occurrence of thermal damage to the addition valve. Thus, similarly to the apparatus described in Japanese Patent No. 4922899, in order to avoid an increase in the temperature of the addition valve in the exhaust gas purification apparatus, it is preferable to execute the cooling fuel addition, in which fuel is injected from the addition valve to cool the addition valve.

However, if the cooling fuel addition is executed during the execution of the desorption process, the amount of fuel contained in the exhaust gas becomes excessive, and the air-fuel ratio of the exhaust gas flowing into the catalyst becomes excessively rich. For this reason, a phenomenon in which unburned fuel in the exhaust gas passes through the catalyst, that is, a so-called HC slip may occur. If the cooling fuel addition is not executed during the execution of desorption process, the temperature of the addition valve increases, and there is a risk of the occurrence of thermal damage to the addition valve.

SUMMARY

An objective of the present disclosure is to provide an exhaust gas purification apparatus for an internal combustion engine capable of suppressing the occurrence of HC slip, while reducing thermal damage to the addition valve during execution of desorption process of the poison release control.

To achieve the foregoing objective and in accordance with one aspect of the present disclosure, a controller for an internal combustion engine is provided. The controller includes a direct injection valve, which directly injects fuel into a cylinder, a NOx storage reduction type catalyst provided in an exhaust passage, an addition valve provided in the exhaust passage on an upstream side of the catalyst to add engine fuel to the exhaust gas, a poison release control section, and a cooling fuel addition section. The poison release control section executes a poison release control for reducing sulfur compound deposited on the catalyst by alternately repeating: a desorption process of desorbing the sulfur compound deposited on the catalyst by performing a fuel supply from the direct injection valve to the exhaust gas in a state in which a temperature of the catalyst is increased to a desorbable temperature, at which the sulfur compound deposited on the catalyst is desorbed; and a pausing process of pausing the supply of fuel from the direct injection valve to the exhaust gas. The cooling fuel addition section executes a cooling fuel addition control of performing a cooling fuel addition for cooling the addition valve by adding engine fuel from the addition valve during execution of the pausing process, and prohibiting the cooling fuel addition during execution of the desorption process. The cooling fuel addition section includes a target temperature calculation section and an addition amount calculation section. The target temperature calculation section calculates a target temperature of the addition valve at the time of start of the desorption process such that the temperature of the addition valve during execution of the desorption process does not exceed a predetermined allowable upper limit temperature. When an amount of fuel added from the addition valve at the time of execution of the cooling fuel addition during execution of the pausing process is defined as a cooling fuel addition amount, the addition amount calculation section calculates the cooling fuel addition amount such that the temperature of the addition valve at the time of start of the desorption process becomes the target temperature.

DETAILED DESCRIPTION OF THE PREFERRED EMBODIMENTS

A controller for an internal combustion engine according to one embodiment will now be described with reference to FIGS. 1 to 7. The above controller is applied to a compression ignition type diesel engine, in which fuel injected into a cylinder is burned by self-ignition due to compression.

Figure 1:
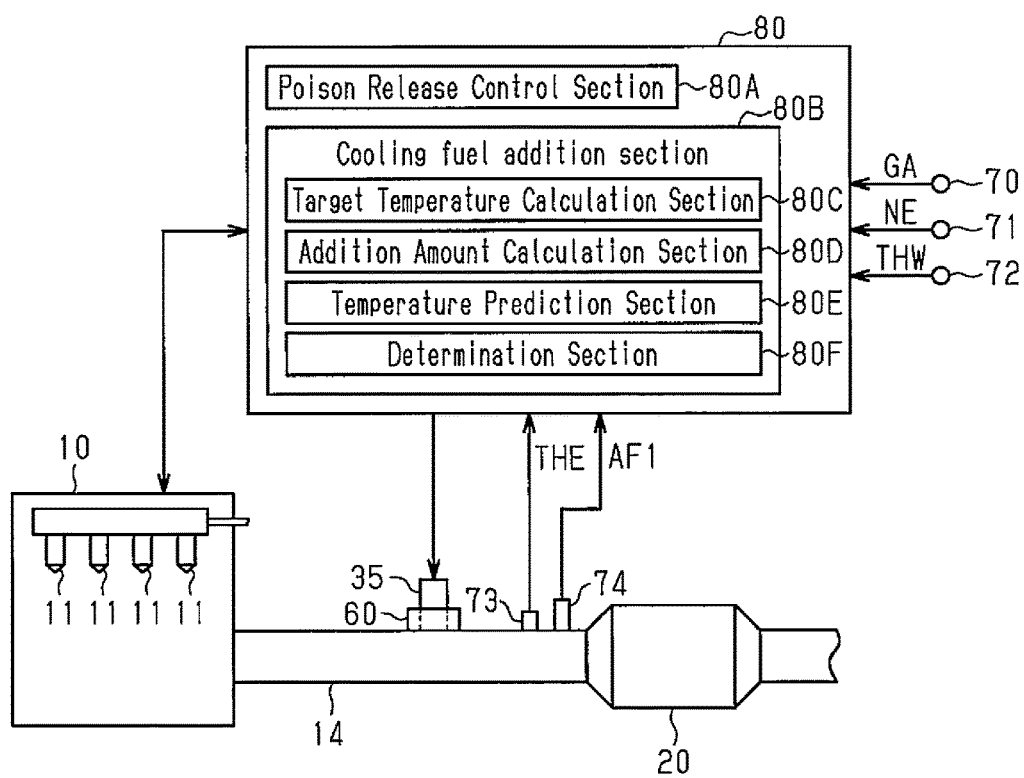
FIG. 1 a schematic diagram illustrating the configuration of a controller for an internal combustion engine according to one embodiment.

As illustrated in FIG. 1, an internal combustion engine 10 is provided with a plurality of direct injection valves 11, which directly injects fuel into cylinders. Further, in the intake passage of the internal combustion engine 10, an intake throttle valve, which adjusts the amount of air sucked into the cylinders, is provided.

A NOx storage reduction catalyst (hereinafter referred to as NSR catalyst) 20 is provided in the exhaust passage 14 of the internal combustion engine 10. The NSR catalyst 20 stores ambient nitrogen oxides under an oxidizing atmosphere. The NSR catalyst 20 discharges the stored nitrogen oxide in a reducing atmosphere to reduce and purify the stored nitrogen oxide.

An electromagnetically driven addition valve 35, which adds fuel of the internal combustion engine 10 to the exhaust gas, is installed in a portion of the exhaust passage 14 on the upstream side of the NSR catalyst 20. The addition valve 35 is provided with a water-cooling type cooling device 60 that shares the coolant of the internal combustion engine 10.

A temperature sensor 73 and an air-fuel ratio sensor 74 are installed in a portion of the exhaust passage 14 in the vicinity of the exhaust inlet of the NSR catalyst 20. The temperature sensor 73 detects the temperature of exhaust gas (hereinafter referred to as an exhaust temperature THE) flowing into the NSR catalyst 20. The air-fuel ratio sensor 74 detects the air-fuel ratio (hereinafter referred to as pre-catalyst exhaust air-fuel ratio AF1) of the exhaust gas flowing into the NSR catalyst 20.

Various sensors are provided in the internal combustion engine 10, besides the aforementioned sensors. For example, an air flowmeter 70, which detects the intake air amount GA, a crank angle sensor 71, which detects the engine rotation speed NE, and a coolant temperature sensor 72, which detects the coolant temperature THW as the temperature of the coolant for cooling the internal combustion engine 10, and the like are provided.

The internal combustion engine 10 is equipped with a controller 80. The controller 80 is equipped with a central processing unit that performs various calculating processes, a read only memory that stores control programs or data, a memory that temporarily stores calculating results of the central processing unit, an input port, an output port, and the like. Output signals of the above-described various sensors are input to the input port of the controller 80. Further, drive circuits for various devices such as the direct injection valve 11 and the addition valve 35 are connected to the output port of the controller 80.

The controller 80 is equipped with a poison release control section 80A, which executes the poison release control for reducing the sulfur compounds deposited on the NSR catalyst 20. A desorption process of desorbing sulfur compounds deposited on the NSR catalyst 20 by performing the fuel supply from the direct injection valve 11 to the exhaust gas, and a pausing process of pausing the fuel supply to the exhaust gas from the direct injection valve 11 are alternately repeated by the poison release control.

Further, the controller 80 is equipped with a cooling fuel addition section 80B, which executes the cooling fuel addition control. By the cooling fuel addition control, the cooling fuel addition for adding fuel from the addition valve 35 to cool the addition valve 35 is performed during the execution of the pausing process, and the cooling fuel addition during execution of the desorption process is prohibited.

The cooling fuel addition section 80B is equipped with a target temperature calculation section 80C, which calculates the target temperature Td of the addition valve 35 at the time of the start of desorption process. Further, the cooling fuel addition section 80B is equipped with an addition amount calculation section 80D. The addition amount calculation section 80D calculates the cooling fuel addition amount CA as an amount of fuel added from the addition valve 35 during execution of the cooling fuel addition such that the temperature of the addition valve 35 at the time of the start of desorption process becomes the target temperature Td.

Further, the cooling fuel addition section 80B is equipped with a temperature prediction section 80E and a determination section 80F. The temperature prediction section 80E predicts the highest temperature of the addition valve 35 during execution of the desorption process. The determination section 80F determines whether or not the highest temperature of the addition valve 35 predicted by the temperature prediction section 80E exceeds an allowable upper limit temperature Tc.

The controller 80 executes various controls such as a fuel injection control for controlling the fuel injection amount and the fuel injection timing of the direct injection valve 11, and an exhaust purification control for suitably performing exhaust purification by the NSR catalyst 20.

In the internal combustion engine 10, the value of the pre-catalyst exhaust air-fuel ratio AF1 is a value larger than the value of the stoichiometric air-fuel ratio ST, while the combustion is performed in the state in which the air-fuel ratio of the air-fuel mixture is larger than the stoichiometric air-fuel ratio ST. At this time, since the NOx in the exhaust gas is stored in the NSR catalyst 20, the emission of NOx to the outside air is suppressed. However, there is a limit to the amount of NOx that can be stored in the NSR catalyst 20. Therefore, in the exhaust purification apparatus of the present embodiment, before the storage amount of NOx in the NSR catalyst 20 reaches the limit, a post injection is performed from the direct injection valve 11 to supply fuel to the exhaust gas from the direct injection valve 11. As a result, the air-fuel ratio of the exhaust gas flowing into the NSR catalyst 20 is made richer than the stoichiometric air-fuel ratio ST, and fuel as a reducing agent is supplied to the NSR catalyst 20. Further, a NOx reduction process is performed, in which the stored NOx is discharged from the NSR catalyst 20 and reduced and purified, using the supplied reducing agent. When the fuel supply to the exhaust gas due to the post injection is insufficient, fuel is also added from the addition valve 35.

Sulfur oxide (SOx) is also contained in the fuel. The NSR catalyst 20 also stores sulfur oxide (SOx) derived from fuel together with NOx under the oxidizing atmosphere. At this time, SOx is stored in the NSR catalyst 20 as a sulfur compound such as sulfate. The sulfur compound stored in the NSR catalyst 20 is not desorbed from the NSR catalyst 20 under the condition of the NOx reduction process. Therefore, sulfur compound is gradually deposited on the NSR catalyst 20. If the sulfur compound is left, a phenomenon in which the NOx storage capacity of the NSR catalyst 20 decreases, so-called sulfur poisoning occurs. Therefore, the controller 80 equipped with the poison release control section 80A performs the sulfur release control for desorbing the sulfur compounds deposited on the NSR catalyst 20.

Figure 2:
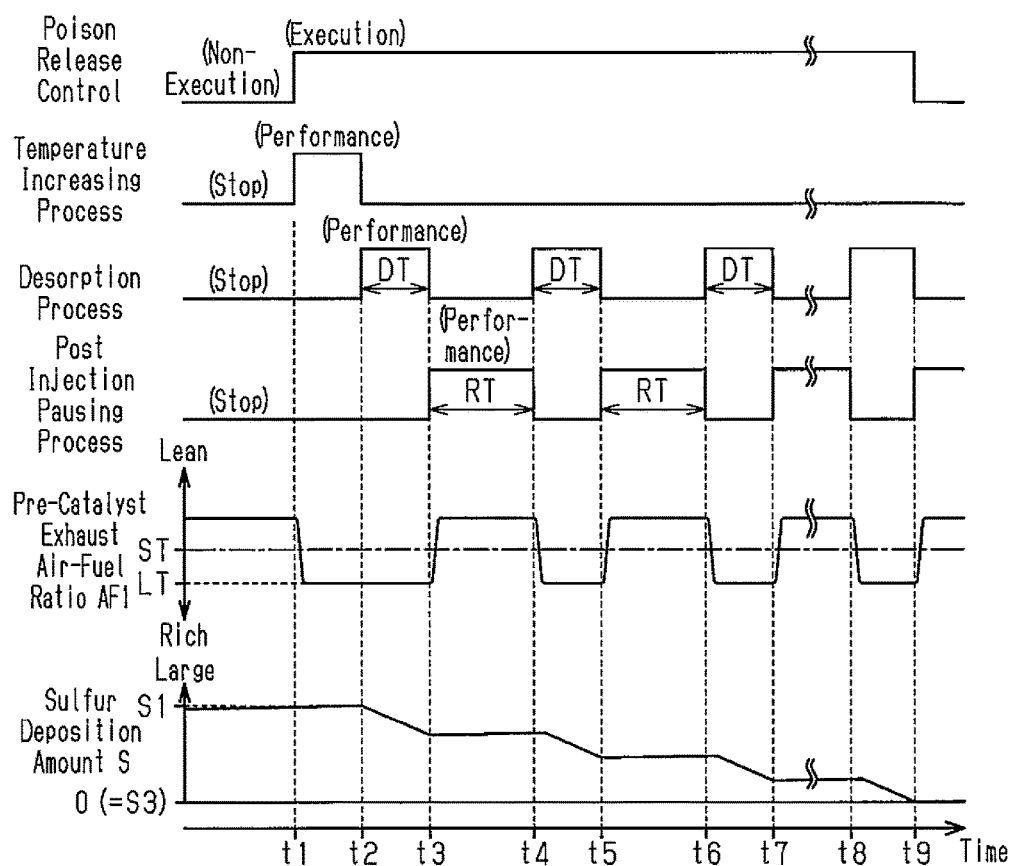
FIG. 2 is a timing diagram illustrating a poison release control of the embodiment.

FIG. 2 illustrates an embodiment of the sulfur release control.

The controller 80 calculates the amount of the sulfur compound (hereinafter referred to as sulfur deposition amount) deposited on the NSR catalyst 20, based on the amount of fuel supplied to the exhaust gas, the temperature of the NSR catalyst 20 obtained from the exhaust temperature THE and the like, the exhaust gas flow rate obtained from the intake air amount GA and the like.

When the sulfur deposition amount S reaches a predetermined start determination value S1 at time t1 of FIG. 2, the poison release control is started. Then, since the temperature increasing process is first performed by adding fuel from the addition valve 35, the temperature of the NSR catalyst 20 increases to a temperature at which the sulfur compound deposited on the NSR catalyst 20 is desorbed.

When the temperature of the NSR catalyst 20 becomes equal to or higher than the desorbable temperature and the temperature increasing process is completed at time t2, the desorption process is subsequently started. The desorption process is temporarily terminated at time t3, at which a predetermined execution period DT elapses from the time t2. Thereafter, the desorption process is started again at time t4, at which a predetermined pausing period RT elapses from the time t3. Thereafter, the desorption process and the pausing process are repeated until the poison release control is completed.

When the desorption process is started, the post injection from the direct injection valve 11 is executed. As a result, the pre-catalyst exhaust air-fuel ratio AF1 becomes a value on a richer side than the stoichiometric air-fuel ratio ST in a state in which the temperature of the NSR catalyst 20 increases to the desorbable temperature by the temperature increasing process. Further, fuel as a reducing agent is supplied to the NSR catalyst 20. As a result, desorption of the sulfur compound from the NSR catalyst 20 is started. Further, during the pausing period RT, a pausing process (hereinafter referred to as post injection pausing process) of pausing the post injection from the direct injection valve 11 is executed. As a result, since the supply of fuel from the direct injection valve 11 to the exhaust gas is paused, the pre-catalyst exhaust air-fuel ratio AF1 has a value on the leaner side than the stoichiometric air-fuel ratio ST.

During execution of the desorption process, the amount of fuel supplied to the NSR catalyst 20 can be increased as the degree of richness of the pre-catalyst exhaust air-fuel ratio AF1 increases. However, if the pre-catalyst exhaust air-fuel ratio AF1 is excessively enriched, a HC slip occurs in the NSR catalyst 20, and there is a risk of a discharge of white smoke from the terminal end of the exhaust passage 14 to the outside air. Therefore, it is necessary to adjust the amount of fuel contained in the exhaust gas so that the air-fuel ratio of the exhaust gas does not become rich beyond the limit air-fuel ratio LT during the execution of the desorption process. The limit air-fuel ratio LT is the minimum value of the air-fuel ratio capable of suppressing the occurrence of HC slip in the NSR catalyst 20. Further, the post injection amount when the air-fuel ratio of the exhaust gas flowing into the NSR catalyst 20 becomes the limit air-fuel ratio LT is obtained from experiments in advance or the like, and is set as the post injection amount during the execution of the desorption process.

The sulfur deposition amount S decreases in accordance with the desorption amount of the sulfur compound from the NSR catalyst 20 during the execution periods (t2 to t3, t4 to t5, t6 to t7, and t8 to t9) of each desorption process. Then, at time t9, at which the value of the sulfur deposition amount S decreases to the end determination value S3 (for example, set to 0 in the present embodiment), the poison release control ends.

During the desorption process, since the temperature of the exhaust gas increases to a desorbable temperature necessary for desorption of the sulfur compound, the temperature of the addition valve 35 provided in the exhaust passage 14 also increases. For this reason, there is a risk of occurrence of thermal damage to the addition valve 35. Therefore, when there is a concern about an increase in the temperature of the addition valve 35, it is preferable to execute the cooling fuel addition in which fuel is added from the addition valve 35 to cool the addition valve 35.

However, if the cooling fuel addition is executed as it is during the desorption process, the amount of fuel contained in the exhaust gas becomes excessive, and the air-fuel ratio of the exhaust gas flowing into the NSR catalyst 20 becomes excessively rich. Therefore, there is a risk of occurrence of HC slip. Further, if the air-fuel ratio of the exhaust gas flowing into the NSR catalyst 20 becomes excessively rich, there is a risk of a decrease in the efficiency of the poison release. However, if the cooling fuel addition is not executed during the execution of the desorption process, since the temperature of the addition valve 35 increases, there is a risk of occurrence of thermal damage to the addition valve 35.

Figure 3:
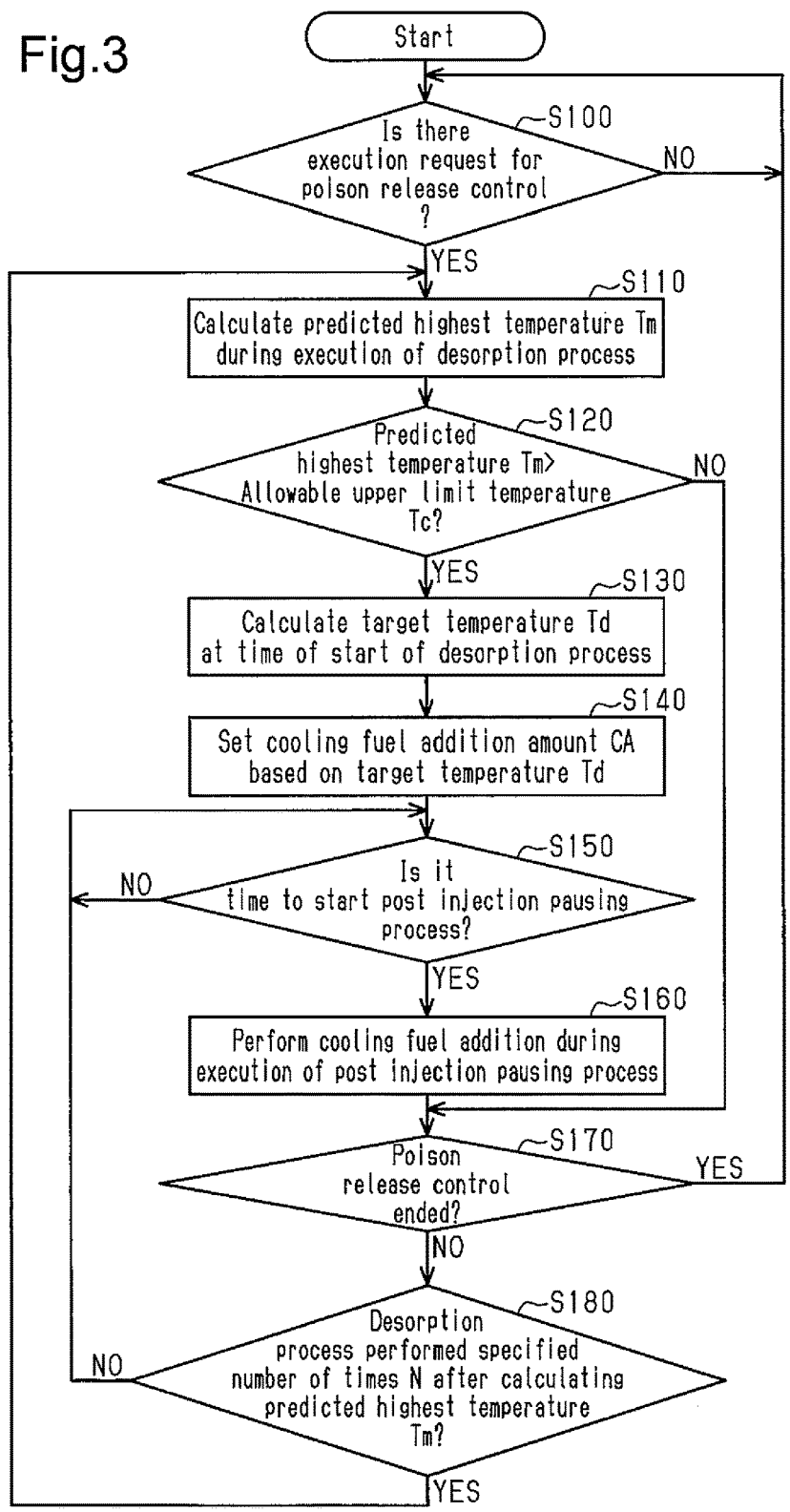
FIG. 3 is a flowchart illustrating a series of process procedures for performing the cooling fuel addition.

Therefore, the controller 80 equipped with the cooling fuel addition section 80B suppresses the occurrence of the above inconvenience, by executing a series of processing procedures illustrated in FIG. 3. The controller 80 executes the processing procedure illustrated in FIG. 3 during the period from the start of the internal combustion engine 10 to the stoppage.

As illustrated in FIG. 3, when starting the main process, the cooling fuel addition section 80B first determines whether or not there is a demand for executing the poison release control (S100). If the sulfur deposition amount S has reached the start determination value S1, the cooling fuel addition section 80B determines that there is an execution request for the poison release control. When there is no execution request for the poison release control (S100: NO), the process of step S100 is repeatedly executed.

When there is an execution request for the poison release control (S100: YES), the temperature prediction section 80E calculates the predicted highest temperature Tm of the addition valve 35 during the execution of the desorption process, prior to execution of the desorption process (S110). The temperature prediction section 80E calculates the predicted highest temperature Tm from the current coolant temperature THW, the current exhaust temperature THE, the current intake air amount, the target exhaust temperature during execution of desorption process, the target intake air amount during execution of desorption process, and the like. The predicted highest temperature Tm is the predicted temperature when it is assumed that the cooling fuel addition of the addition valve 35 is not performed during execution of the desorption process.

Next, the determination section 80F determines whether or not the calculated predicted highest temperature Tm exceeds the allowable upper limit temperature Tc (S120). The allowable upper limit temperature Tc is the highest temperature at which the occurrence of thermal damage due to the increase in the temperature of the addition valve 35 can be suppressed. When the predicted highest temperature Tm exceeds the allowable upper limit temperature Tc (S120: YES), the target temperature calculation section 80C calculates the target temperature Td of the addition valve 35 at the time of start of the desorption process (S130). The target temperature Td is a temperature that is set to lower the temperature of the addition valve 35 at the time of start of the desorption process in advance such that the temperature of the addition valve 35 during execution of the desorption process does not exceed the allowable upper limit temperature Tc.

Figure 4:
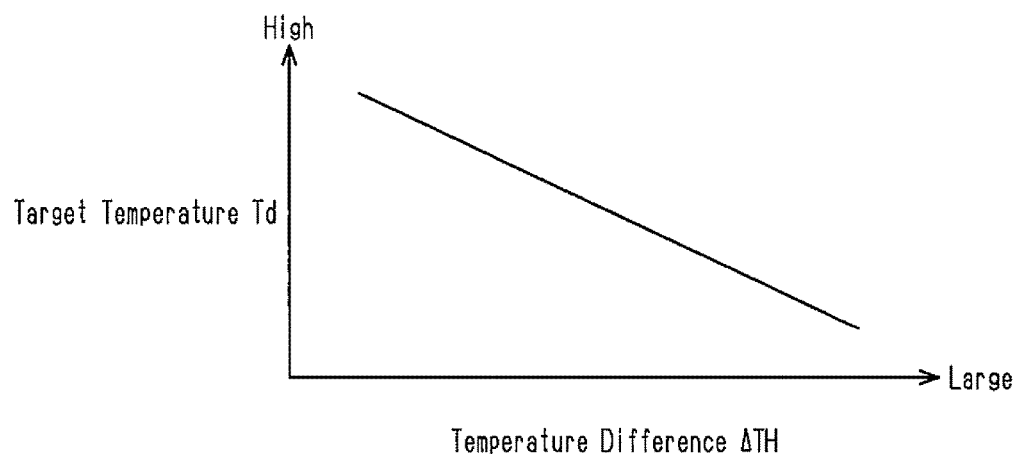
FIG. 4 is a graph showing a setting mode of a target temperature.

As illustrated in FIG. 4, in step S130, the target temperature calculation section 80C calculates a temperature difference $\Delta$TH ($\Delta$TH=Tm−Tc) obtained by subtracting the allowable upper limit temperature Tc from the predicted highest temperature Tm of the addition valve 35. Further, the target temperature calculation section 80C calculates the target temperature Td such that the higher the value of the temperature difference $\Delta$TH, the lower the target temperature Td becomes.

Next, the addition amount calculation section 80D calculates the cooling fuel addition amount CA based on the target temperature Td (S140). The cooling fuel addition amount CA is the amount of fuel required to lower the temperature of the addition valve 35 at the time of start of the desorption process such that the temperature of the addition valve 35 becomes the target temperature Td during execution of the post injection pausing process, by performing the cooling fuel addition during execution of the post injection pausing process. Further, the cooling fuel addition amount CA is the total amount of fuel that is added from the addition valve 35 while executing the post injection pausing process once. In other words, the cooling fuel addition amount CA is the total amount of fuel that is added from the addition valve 35 during one pausing period RT. The relationship between the target temperature Td and the necessary cooling fuel addition amount CA is obtained in advance.

Figure 5:
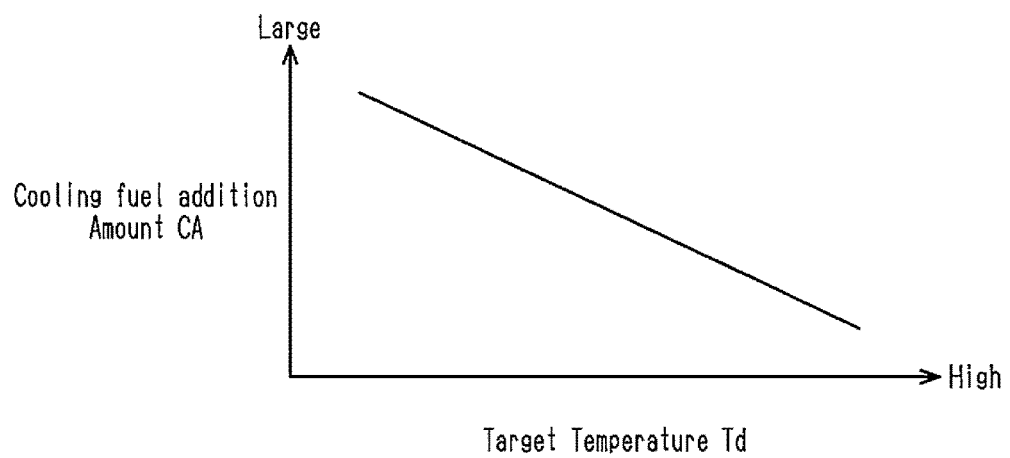
FIG. 5 is a graph showing a setting mode of the cooling fuel addition amount.

As illustrated in FIG. 5, the addition amount calculation section 80D calculates the cooling fuel addition amount CA such that the lower the target temperature Td decreases, the larger the cooling fuel addition amount CA becomes.

Next, the cooling fuel addition section 80B determines whether it is time to start the post injection pausing process (S150). When it is not the time to start the post injection pausing process (S150: NO), the process of step S150 is repeatedly executed.

If it is the time to start the post injection pausing process (S150: YES), the cooling fuel addition section 80B performs the cooling fuel addition of the addition valve 35 during execution of the post injection pausing process (S160).

Figure 6:
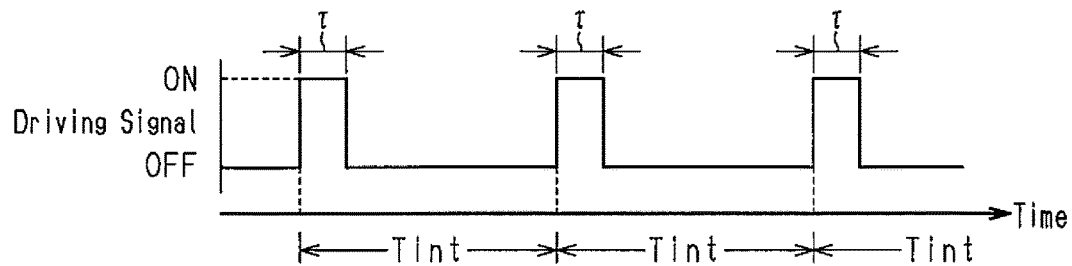
FIG. 6 is a timing diagram illustrating a driving signal of an addition valve.

As illustrated in FIG. 6, in S160, the cooling fuel addition section 80B performs an intermittent addition, in which fuel is periodically and repeatedly injected from the addition valve 35 to the exhaust gas. At the time of execution of the intermittent addition, the addition valve 35 is energized only for a predetermined driving time t for each driving interval time Tint. The driving time t is a time for which the driving signal output from the controller 80 to the drive circuit of the addition valve 35 is held in the ON state to maintain the valve opening operation of the addition valve 35. The driving time $\tau$ is set to a time for which it is possible to suppress the consumption amount of fuel as much as possible while securing the cooling effect of the addition valve 35, for example, a minimum value or the like capable of being set as a driving time of the addition valve 35. Further, by dividing the cooling fuel addition amount CA by the amount of fuel injected from the addition valve 35 within the driving time $\tau$, the number of fuel additions of the addition valve 35 during one pausing period RT is obtained. Further, a value obtained by dividing the time of one pausing period RT by the number of fuel additions is set as the driving interval time Tint at the time of execution of the cooling fuel addition during execution of the post injection pausing process.

In this processing procedure, since the cooling fuel addition is not performed until an affirmative determination is made in step S150, the cooling fuel addition is prohibited during execution of the desorption process. Therefore, through the processes of step S150 and step S160, the cooling fuel addition control is executed, in which the cooling fuel addition of the addition valve 35 is performed during the execution of the post injection pausing process, and the cooling fuel addition of the addition valve 35 is prohibited during the execution of the desorption process.

When the process in step S160 is executed or when a negative determination is made in step S120, the cooling fuel addition section 80B determines whether or not the poison release control has ended (S170). In step S170, when the sulfur deposition amount S decreases to the end determination value S3, the cooling fuel addition section 80B determines that the poison release control has ended. When it is determined that the poison release control has ended (S170: YES), the process returns to step S100.

If the poison release control has not ended (S170: NO), the cooling fuel addition section 80B determines whether or not the desorption process has been executed a specified number of times N, which was previously determined (S180). The specified number of times N is set to the number of times of desorption process corresponding to the time required for the coolant temperature THW to change to the extent of having an influence on the calculation of the predicted highest temperature Tm.

When the desorption process has not been executed the specified number of times N yet (S180: NO), the cooling fuel addition section 80B executes the processes subsequent to step S160 again. In this case, the cooling fuel addition by the currently set cooling fuel addition amount CA is executed again.

If the desorption process has been executed the specified number of times N (S180: YES), the cooling fuel addition section 80B executes the processes subsequent to step S110 again. In this case, when the calculation of the predicted highest temperature Tm is performed again, the predicted highest temperature Tm is updated. Further, when the updated predicted highest temperature Tm is equal to or lower than the allowable upper limit temperature Tc (S120: NO), the cooling fuel addition control of the addition valve 35 is not executed. When the updated predicted highest temperature Tm exceeds the allowable upper limit temperature Tc (S120: YES), the calculation of the temperature difference $\Delta$TH is performed again based on the updated predicted highest temperature Tm, and the target temperature Td is updated (S130). Further, the cooling fuel addition amount CA is updated based on the updated target temperature Td (S140), and the cooling fuel addition of the addition valve 35 by the updated cooling fuel addition amount CA is executed (S160).

The present embodiment has the following operations and advantages.

(1) In a case where it is determined that the predicted highest temperature Tm exceeds the allowable upper limit temperature Tc (S120 of FIG. 3) when there is an execution request for the poison release control (S100 of FIG. 3: YES), the cooling fuel addition control is executed, in which the cooling fuel addition of the addition valve 35 is performed during the execution of post injection pausing process, and the cooling fuel addition is prohibited during the desorption process (S150 and S160 of FIG. 3).

Figure 7:
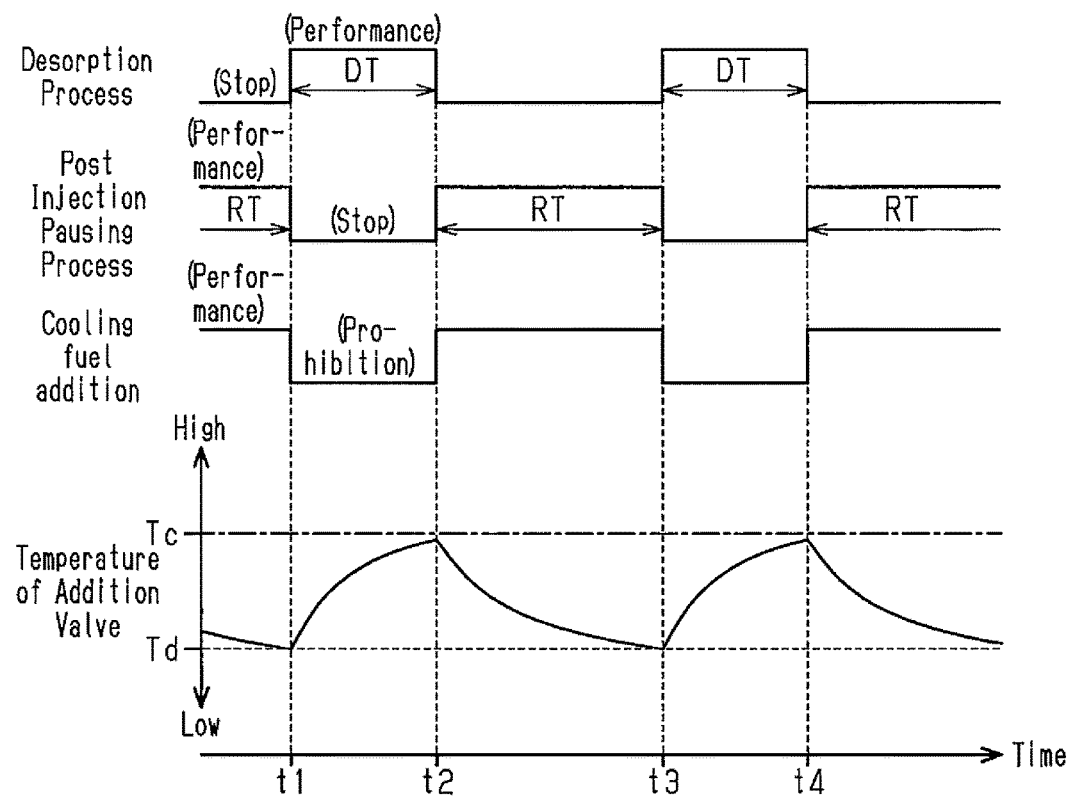
FIG. 7 is a timing diagram illustrating movements of the temperature of the addition valve.

FIG. 7 illustrates an example of movements of the temperature of the addition valve 35 when it is determined that the predicted highest temperature Tm of the addition valve 35 exceeds the allowable upper limit temperature Tc.

As illustrated in FIG. 7, since the cooling fuel addition of the addition valve 35 is prohibited during execution of the desorption process (time t1 to time t2, and time t3 to time t4), the excessive enrichment of the air-fuel ratio of exhaust gas during execution of the desorption process is suppressed. Accordingly, it is possible to suppress the occurrence of HC slip. Further, since the excessive enrichment of the air-fuel ratio of the exhaust gas during execution of the desorption process is suppressed, it is also possible to suppress the reduction in efficiency of poison release when performing the poison release control.

However, if the cooling fuel addition during the desorption process is prohibited, the temperature of the addition valve 35 gradually increases during execution of the desorption process. In this regard, in this embodiment, the cooling fuel addition of the addition valve 35 is performed during execution of the post injection pausing process so that the temperature of the addition valve 35 during execution of the desorption process does not exceed the allowable upper limit temperature Tc. As a result, the temperature of the addition valve 35 at the time of start of desorption process decreases in advance to the target temperature Td (time t1, and time t3). In this case, since the temperature of the addition valve 35 is sufficiently low before the start of the desorption process, even if the temperature of the addition valve 35 increases during execution of the desorption process (time t1 to time t2, and time t3 to time t4), the temperature of the addition valve 35 does not exceed the allowable upper limit temperature Tc. Therefore, it is also possible to suppress the occurrence of thermal damage to the addition valve 35 during execution of desorption process.

(2) The predicted highest temperature Tm of the addition valve 35 during execution of the desorption process is calculated. When it is determined that the calculated predicted highest temperature Tm exceeds the allowable upper limit temperature Tc (S120: YES of FIG. 3), the cooling fuel addition control is executed (S150 and S160 of FIG. 3). That is, the cooling fuel addition control is executed only when there is a possibility that the temperature of the addition valve 35 may exceed the allowable upper limit temperature Tc during execution of the desorption process. Therefore, it is possible to appropriately determine the situation in which the cooling fuel addition control needs to be executed.

(3) As the temperature difference ΔTH obtained by subtracting the allowable upper limit temperature Tc from the predicted highest temperature Tm of the addition valve 35 predicted by the temperature prediction section increases, it is preferable to further lower the temperature of the addition valve 35 at the time of start of the desorption process, so that the temperature of the addition valve 35 does not reach the allowable upper limit temperature Tc during execution of the desorption process. Further, the larger the cooling fuel addition amount CA during execution of the post injection pausing process, the lower the temperature of the addition valve 35 at the time of start of the desorption process becomes.

Therefore, as illustrated in FIG. 4, the target temperature Td is calculated such that the larger the temperature difference ΔTH, the lower the target temperature Td becomes. Further, as illustrated in FIG. 5, the cooling fuel addition amount CA is calculated such that the lower the target temperature Td, the larger the fuel addition amount CA becomes. Therefore, it is possible to appropriately calculate the cooling fuel addition amount CA required to prevent the temperature of the addition valve 35 during execution of the desorption process from exceeding the allowable upper limit temperature Tc.

(4) When the desorption process has not been executed the specified number of times N (S180 of FIG. 3: NO), the processes subsequent to step S150 are executed again. Thus, the cooling fuel addition control of the addition valve 35 is performed without updating the target temperature Td and the cooling fuel addition amount CA that are currently calculated. As described above, until the execution number of times of the desorption process during the execution of the poison release control reaches the specified number of times N, which was previously determined, the update of the target temperature Td performed by the target temperature calculation section 80C is suspended, and the update of the cooling fuel addition amount CA provided by the addition amount calculation section 80D is suspended. Therefore, it is possible to reduce the calculation load of the target temperature Td and the cooling fuel addition amount CA, as compared with a case where the target temperature Td and the cooling fuel addition amount CA are calculated each time the desorption process is executed once.

The above-described embodiment may be modified as follows.

The process of step S180 illustrated in FIG. 3 may be omitted. Further, when a negative determination is made in step S170, the processes subsequent to step S110 may be executed. That is, the target temperature Td and the cooling fuel addition amount CA may be calculated each time the desorption process is executed once. Even in this case, it is possible to obtain operational effects other than the above (4).

In the above embodiment, the driving interval time Tint is varied in accordance with the cooling fuel addition amount CA in order to inject fuel corresponding to the cooling fuel addition amount CA from the addition valve 35 within the pausing period RT of the post injection pausing process. In addition, by setting the driving interval time Tint to a fixed value and by changing the driving time t of the addition valve 35 depending on the cooling fuel addition amount CA, the fuel corresponding to the cooling fuel addition amount CA may be injected from the addition valve 35 within the pausing period RT of the post injection pausing process.

The target temperature Td of the addition valve 35 at the time of start of the desorption process is calculated such that the temperature of the addition valve 35 during execution of the desorption process does not exceed the allowable upper limit temperature Tc. At this time, although the target temperature Td is calculated based on the temperature difference ΔTH, the target temperature Td may be calculated in other manners. For example, when the value of the temperature difference ΔTH is large, the value of the predicted highest temperature Tm is higher than that in a case where the value of the temperature difference ΔTH is small. Therefore, the target temperature Td may be directly calculated from the value of the predicted highest temperature Tm, without calculating the temperature difference ΔTH. In this case, the target temperature Td is calculated such that the higher the value of the predicted highest temperature Tm, the lower the target temperature Td becomes.

When a negative determination is made in step S120, the cooling fuel addition control of the addition valve 35 is not executed. In addition, when a negative determination is made in step S120, the cooling fuel addition control may be executed, in which the cooling fuel addition of the addition valve 35 is performed during execution of the post injection pausing process with a cooling fuel addition amount smaller than the cooling fuel addition amount CA, and the cooling fuel addition of the addition valve 35 is prohibited during the execution of the desorption process. In this case, even when the predicted highest temperature Tm is equal to or lower than the allowable upper limit temperature Tc, the temperature of the addition valve 35 decreases during execution of the post injection pausing process.

In the aforementioned embodiment, the post injection is performed in order to supply fuel to the exhaust gas from the direct injection valve 11 when the desorption process is executed. In addition, fuel may be supplied to the exhaust gas from the direct injection valve 11 by performing a rich spike or the like for temporarily enriching the air-fuel ratio of the air-fuel mixture. In the case of executing the rich spike, it is possible to perform the pausing process of pausing the supply of fuel from the direct injection valve 11 to the exhaust gas by executing the process of observing the rich spike during the above-mentioned pausing period RT.

The invention claimed is:

1. A controller for an internal combustion engine, the controller comprising:
   a direct injection valve, which directly injects an engine fuel into a cylinder;
   a NOx storage reduction type catalyst provided in an exhaust passage;
   an addition valve provided in the exhaust passage on an upstream side of the catalyst to add the engine fuel to an exhaust gas;
   a poison release control section, which executes a poison release control for reducing sulfur compound deposited on the catalyst by alternately repeating
      a desorption process of desorbing the sulfur compound deposited on the catalyst by performing a fuel supply from the direct injection valve to the exhaust gas in a state in which a temperature of the catalyst is increased to a desorbable temperature, at which the sulfur compound deposited on the catalyst is desorbed, and
      a pausing process of pausing the supply of the fuel from the direct injection valve to the exhaust gas; and
   a cooling fuel addition section, which executes a cooling fuel addition control of performing a cooling fuel addition for cooling the addition valve by adding the engine fuel from the addition valve during execution of the pausing process, and prohibiting the cooling fuel addition during execution of the desorption process,
   wherein the cooling fuel addition section includes
      a target temperature calculation section, which calculates a target temperature of the addition valve at a time of start of the desorption process such that a temperature of the addition valve during execution of the desorption process does not exceed a predetermined allowable upper limit temperature, and
      an addition amount calculation section, wherein, when an amount of the fuel added from the addition valve at a time of execution of the cooling fuel addition during execution of the pausing process is defined as a cooling fuel addition amount, the addition amount calculation section calculates the cooling fuel addition amount such that the temperature of the addition valve at the time of start of the desorption process becomes the target temperature.

2. The controller for the internal combustion engine according to claim 1, wherein the cooling fuel addition section further includes
   a temperature prediction section, which predicts a highest temperature of the addition valve during execution of the desorption process, and
   a determination section, which determines whether the highest temperature of the addition valve predicted by the temperature prediction section exceeds the allowable upper limit temperature, and
   when it is determined by the determination section that the highest temperature of the addition valve exceeds the allowable upper limit temperature, the cooling fuel addition section executes the cooling fuel addition control.

3. The controller for the internal combustion engine according to claim 2, wherein
   the target temperature calculation section calculates the target temperature such that a greater a value obtained by subtracting the allowable upper limit temperature from the highest temperature of the addition valve predicted by the temperature prediction section, lower the target temperature becomes, and
   the addition amount calculation section calculates the cooling fuel addition amount such that the lower the target temperature, greater the cooling fuel addition amount becomes.

4. The controller for the internal combustion engine according to claim 1, wherein, until an number of times of execution of the desorption process during execution of the poison release control reaches a predetermined number of times, the cooling fuel addition section suspends an update of the target temperature of the target temperature calculation section and suspends an update of the cooling fuel addition amount of the addition amount calculation section.

* * * * *